United States Patent [19]

Weinstein

[11] 4,313,965

[45] Feb. 2, 1982

[54] ICE CREAM CONE WITH JACKET ATTACHED AND METHOD THEREFOR

[75] Inventor: David Weinstein, Baltimore, Md.

[73] Assignee: Maryland Cup Corporation, Owings Mills, Md.

[21] Appl. No.: 910,886

[22] Filed: May 30, 1978

Related U.S. Application Data

[63] Continuation-in-part of Ser. No. 885,278, Mar. 10, 1978.

[51] Int. Cl.³ ............... A21D 15/00; B65B 11/10
[52] U.S. Cl. ................... 426/139; 426/811; 426/394; 53/397; 53/141
[58] Field of Search .......... 426/139, 135, 132, 811; 221/1, 290, 113, 240; 53/397, 141

[56] References Cited

U.S. PATENT DOCUMENTS

| | | | |
|---|---|---|---|
| 2,001,371 | 5/1935 | Thoke | 426/139 |
| 2,045,730 | 6/1936 | Schepman et al. | 426/139 |
| 2,108,418 | 2/1938 | Thomas | 426/139 |
| 2,228,942 | 1/1941 | Balton | 426/139 |
| 2,303,420 | 12/1942 | Amberg et al. | 53/379 |
| 2,557,602 | 6/1951 | Huitt | 426/139 |
| 2,965,499 | 12/1960 | Wise | 426/139 |
| 4,136,800 | 1/1979 | Christner et al. | 426/139 |

*Primary Examiner*—Jeanette M. Hunter
*Attorney, Agent, or Firm*—Birch, Stewart, Kolasch & Birch

[57] ABSTRACT

An ice cream cone product is provided having a sanitary paper jacket adhered thereto which is sufficiently adherent for shipping, handling and vending but which is selectively removable without leaving jacket remnants thereon at the point of consumption. A jacket is telescopically juxtaposed over the cone after the jacket interior is dosed with a mixture of water vapor and propylene glycol.

7 Claims, 2 Drawing Figures

ICE CREAM CONE WITH JACKET ATTACHED AND METHOD THEREFOR

This invention is a continuation-in-part of the inventor's copending application Ser. No. 885,278, filed Mar. 10, 1978.

FIELD OF THE INVENTION

This invention relates to baked ice cream cones and more particularly to such baked ice cream cones with a paper protective jacket attached thereto together with a method and apparatus for attaching the jacket to the said cone.

BACKGROUND OF THE INVENTION

When an ice cream cone is to be served by a vendor to a customer, by filling the ice cream cone with the customer's choice of ice cream or other frozen confections, the normal procedure is for the vendor to remove the cone from the shipping container in which the vendor received it and serve it to the customer either as is or with a piece of paper or napkin wrapped around the cone. In either case, the cone is subject to some direct contact by the vendor's personnel prior to serving which is, at best, marginally sanitary. Efforts in the industry have been made to alleviate this condition by having the vendor try to apply some form of protective wrap before taking the cone from the shipping box. This proves to be cumbersome, time-consuming and impractical, however, from the vendor's standpoint and accordingly, is not universally practiced.

Other attempts to apply wraps to baked ice cream cones at the point of manufacture, prior to packing the cone in the shipping box or carton, resulted in the wraps coming loose during shipping or slipping off of the cone when the vendor attempted to dispense the cone from the package, therefore, returning the vendor to the previous condition, namely, providing a cumbersome, time-consuming and impractical effort to render the vending of ice cream cones more sanitary.

Accordingly, it is an object of the present invention to provide a combination ice cream cone-in-jacket in which the jacket is sufficiently affixed to the cone such that the vendor will find it practical to leave the jacket on the cone during the vending operation and yet which will permit the consumer to readily separate the jacket from the cone at the point of purchase.

Another object of the present invention is to provide a new and novel method for applying a jacket to a baked ice cream cone such that the jacket will adhere to the cone sufficiently during packing, shipping and dispensing to preclude its accidental removal and yet which will be readily separable from the cone if such is intended by a consumer.

Yet another object of the present invention is to provide an apparatus for placing a jacket on a cone in such a manner as to preclude its accidental removal therefrom.

These and other objects of the present invention will become more fully apparent with reference to the following specification and drawings which relate to a preferred embodiment of the present invention.

SUMMARY OF THE INVENTION

A plurality of ice cream cones from a conventional ice cream cone baker or other production device are provided in spaced apart continuous motion along a conveyor which is coordinated with a plurality of nested frusto-conical jackets of conformal shape to the exterior of the multiplicity of ice cream cones dispensed one at a time to be placed on the same conveyor as the ice cream cones intermediate adjacent ones of said cones and subsequently passed through a nesting device such that a cone in jacket will be caused to nest together, with the jacket preceeding the cone receiving the trailing cone and subsequently, the nested cones in jackets will themselves be fully nested and ultimately placed into a shipping container or the like. During the dispensing operation of the nested jackets in synchronism with the spaced apart cones on the conveyor, the nested jackets pass from a primary jacket dispenser into a secondary jacket dispenser where they are momentarily held and subjected to an internal application of a vaporized mixture of water and propylene glycol. Subsequent to this application, each jacket is dispensed through a chute which directs it onto the cone conveyor at a position intermediate a pair of cones. Thus, the jacket is in position to receive a trailing ice cream cone and because of its premoistened condition, will adhere to the cone sufficiently to preclude accidental removal during packing, shipping and dispensing and yet will be readily removable by a customer at point of purchase. The optimum percentages propylene glycol and water are on the order of 85% and 15%, respectively.

BRIEF DESCRIPTION OF THE DRAWINGS

FIG. 1 is a combined cross-sectional view and enlarged partial detail of a baked conical ice cream cone nested in a conical paper jacket or the like.

DETAILED DESCRIPTION OF THE DRAWINGS

Figure 1:
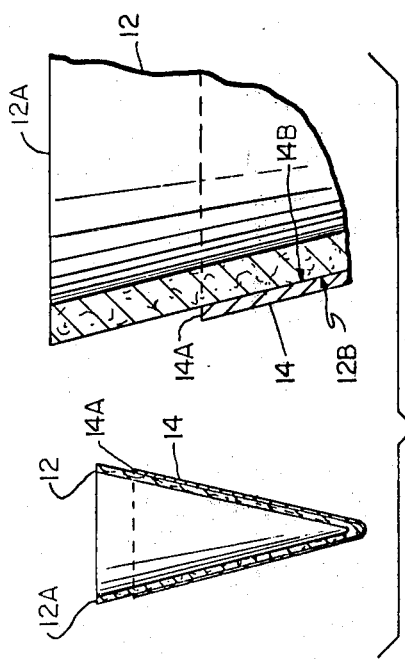
Figure 2:
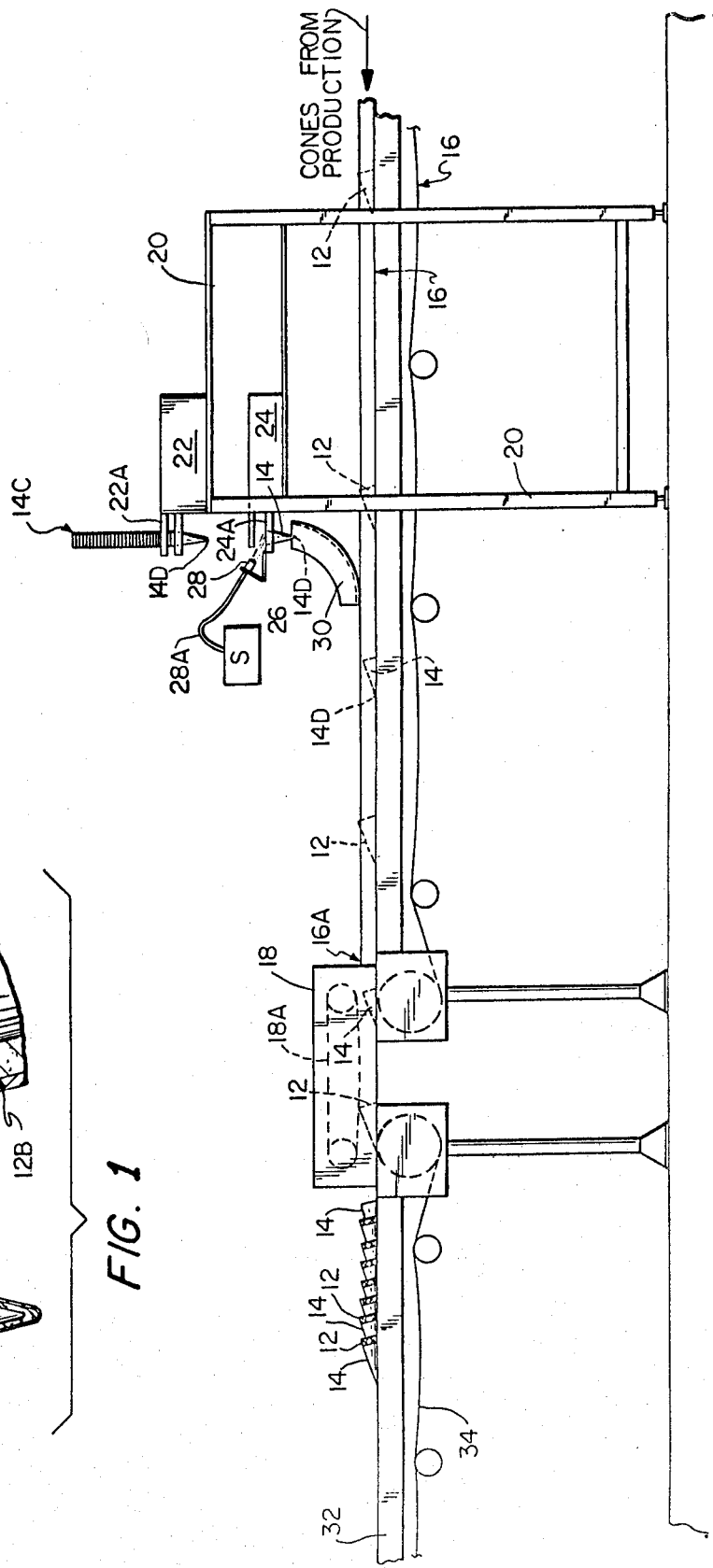
FIG. 2 is a schematic of a method in production line apparatus for the production of the jacketed ice cream cone of FIG. 1.

Referring in detail to the drawings with particular reference to FIGS. 1 and 2, an ice cream cone 12 of the present invention is shown as being conical in shape and is constituted of baked cookie dough or the like as is conventional in the art. A conical paper jacket 14 is superimposed or telescoped over the closed apex of the ice cream cone 12 and extends to an uppermost edge 14A which terminates somewhat below the top 12A of the ice cream cone 12. This leaves the uppermost portion of the ice cream cone 12 exposed for display purposes and prevents contact of the ice cream dip and the jacket for easy removal by the customer, without leaving enough exposed to be contacted by the hand of the vendor at the point of purchase by the consumer.

The paper jacket 14 is caused to adhere to the external surface 12B of the ice cream cone 12 in an amount sufficient to preclude its casual or accidental removal therefrom but not so tight as to cause remnants thereof from remaining on the ice cream cone 12 in the event that the consumer deliberately attempts to remove the protective jacket.

This selective adherence is made possible by applying a dosage of a mixture of water vapor and propylene glycol from a nozzle into the interior of the paper jacket 14. A short duration burst of said mixture has been found to provide sufficient interaction between the internal surface 14B of the paper jacket 14 and the external surface 12B of the ice cream cone 12 to cause the necessary adherence therebetween to achieve the desired result.

Referring now to FIG. 2, the ice cream cones 12 are shown as being in spaced apart relationship on a conveyor belt 16 or the like and proceed from right to left in the drawing as shown while maintaining their spaced apart relationship over a reach of the conveyor extending from a production point for the cones (not shown) to a point 16A immediately upstream of the entrance to a nesting device 18 which is schematically shown at the end of the conveyor 16. Upstream of the nesting device 18 is a machine stand 20 which extends above the conveyor 16 to support a primary jacket dispenser 22 at the uppermost portion thereof and a secondary jacket dispenser 24 located vertically beneath the primary jacket dispenser 22 on the frame 20.

The primary jacket dispenser 22 has an outboard dispensing mechanism 22A which cooperates with the stock 14C of nested jackets 14 such that the apex 14D of each the jackets is pointed downwardly and the dispensing mechanism 22A is any suitable type which will dispense one conical jacket at a time from the stack 14C and permit it to fall by gravity with the point 14D downwardly into a receiving bracket and further dispensing mechanism 24A in the secondary jacket dispenser 24. An additional bracket 26 is provided adjacent the dispensing mechanism 24A on the secondary jacket dispenser 24 for supporting a nozzle 28 in close proximity to the open paper jacket 14 being held by the secondary dispensing bracket 24A in order that a jet of vapor of a mixture comprised of about 85% propylene glycol and 15% water may be injected into the open upper end of the jacket 14 to thereby selectively moisten the interior thereof. The nozzle 28 is connected through a steam line or other fluid hose connection 28A to a source S of the aforesaid mixture of propylene glycol and water.

Immediately beneath the secondary dispensing bracket 24A is an orientation chute 30 which receives and dispenses a premoistened jacket 14 from the secondary dispensing bracket 24A of the secondary jacket dispenser 24 and directs it from a vertical position into a horizontal position between two of the cones 12 on the conveyor 16 with the apex 14D in the leading direction such that the attitude of the jacket 14 on the conveyor 16 is identical with the attitudes of the cones 12 on the same conveyor.

The jacket 14 leads the cone 12 through the nesting device 18 which includes suitable driving rods 18A and the like to drive cone 12 into a waiting moistened jacket 14 on packing table belt 34 at the indicated siamese point. From the packing table 32, the combined nested cone-in-jacket combinations 12 and 14 are selectively dispensed or conveyed into suitable packing crates and the like, now shown.

In the foregoing description of the invention it is to be understood that the term paper jacket is merely an exemplary one and is in no way intended to preclude the use of foil or other suitable wrapping materials such as plastics and laminates. The jacket itself can be any suitable configuration which conforms sufficiently to the surface of the cone to adhere thereto and can be wrapped thereon as well as preformed.

The fact that the jackets of the present invention will adhere to the cones in a manner in which they do provide a new and desirable advertising medium which is of great importance in any commercial product.

Additionally, it is significant that prior to the present invention, it has been the practice to bar all liquids from the packaging area where baked cones and the like are put in the jackets since until the present invention, the moisture was found to bind the jacket to the cone so securely that they could not be easily or completely separated. Parts of the jacket would become permanently attached to the cone and render the produce at the consumer level undesirable.

The preferred dosage of the vaporized mixture of about 15% water and about 85% propylene glycol has been found to be about a volume equivalent to 60 milligrams at room temperature for such vapor with a particle size of 1 micron. With regard to the percentages of propylene glycol and water it has been determined that 90% or more of propylene glycol and 10% or less of water will fail to cause jackets to adhere to the cones and that 80% or less of propylene glycol and 20% or more of water will result in sticking between the jackets and the cones such that the jackets tend to deface the cones upon removal. Accordingly, the optimum percentages of ingredients for the mixture of the present invention are about 85% propylene glycol and about 15% water.

From the foregoing description and drawings, it can be readily seen that the present invention provides a uniquely simple and straightforward method and apparatus for effecting the desired end result, namely, a combined baked ice cream cone and protective sanitary jacket product which remain in a unitary construction with sufficient strength to withstand handling and dispensing at the consumer's point of purchase and yet still provide for the consumer to readily remove the sanitary jacket from the cone without defacing the cone such as by leaving remnants thereof on the cone at the point of purchase and consumption thereof.

It should be understood that the ice cream cone with jacket attached and method and apparatus for producing the same of the present invention may be modified as would occur to one of ordinary skill in the art without departing from the spirit and scope of the present invention.

It is claimed:
1. The method of adhering a sanitary jacket to a conformally shaped ice cream cone comprising the steps of:
   applying a dose of vapor consisting of a mixture of about 85% propylene glycol and about 15% water in a short duration burst to the interior of said jacket;
   inserting an ice cream cone into said jacket into juxtaposition therewith while said vapor remains on the internal surface of said jacket; and
   drying the combined cone and jacket.
2. The method of claim 1 in which said dose of vapor is on the order of 60 milligrams and having a particle size on the order of one micron.
3. The jacketed cone product by the method of claim 1.
4. The jacketed cone product by the method of claim 1 wherein said jacket is constructed of paper.
5. The jacketed cone product by the method of claim 2.
6. The method of adhering sanitary jackets on to each of a succession of ice cream cones of a conformal shape with said jackets comprising:
   conveying a plurality of ice cream cones apex first along a conveyor at regularly spaced intervals;

storing a vertical stack of said paper jackets above said conveyor and the conveyed path of said cones;

dispensing said jackets one at a time from said stack to a work holding means and injecting a vaporized mixture of about 85% propylene glycol and about 15% water in a short duration burst into the interior thereof;

dispensing said vapor injected jackets onto said conveyor at substantially equal spaced intervals with said cones; and inserting a trailing cone into and in position with a leading jacket while the latter is still moist from the vapor injection.

7. The invention of claim 6 in which said dose of water vaporized mixture is on the order of about 60 milligrams and has a particle size on the order of one micron.

* * * * *